United States Patent [19]

Hibino et al.

[11] Patent Number: 5,657,668

[45] Date of Patent: Aug. 19, 1997

[54] TILT TYPE STEERING APPARATUS

[75] Inventors: Tadashi Hibino, Maebashi; Akira Aida, Takasaki; Sakae Matsumoto, Takasaki; Mikio Yamaguchi, Takasaki, all of Japan

[73] Assignee: NSK, Ltd., Tokyo, Japan

[21] Appl. No.: 507,215

[22] Filed: Jul. 26, 1995

Related U.S. Application Data

[63] Continuation-in-part of Ser. No. 421,607, Apr. 13, 1995, abandoned.

[30] Foreign Application Priority Data

Jun. 6, 1994 [JP] Japan .................. 6-123907
Oct. 28, 1994 [JP] Japan .................. 6-265260

[51] Int. Cl.⁶ .................................................. B62D 1/18
[52] U.S. Cl. ........................................ 74/493; 74/495
[58] Field of Search ............................... 74/493, 495

[56] References Cited

U.S. PATENT DOCUMENTS

| | | | |
|---|---|---|---|
| 4,279,176 | 7/1981 | Minamitani | 74/493 |
| 5,078,022 | 1/1992 | Ichikawa | 74/493 |
| 5,143,402 | 9/1992 | Higashino et al. | 74/493 |
| 5,144,855 | 9/1992 | Yamaguchi et al. | 74/493 |
| 5,282,394 | 2/1994 | Dominique et al. | 74/493 |
| 5,409,261 | 4/1995 | Yamaguchi | 280/775 |
| 5,452,624 | 9/1995 | Thomas et al. | 74/493 |

FOREIGN PATENT DOCUMENTS

| | | |
|---|---|---|
| 1-114369 | 8/1989 | Japan . |
| 2273971 | 7/1994 | United Kingdom . |

*Primary Examiner*—Charles A. Marmor
*Assistant Examiner*—David M. Fenstermacher
*Attorney, Agent, or Firm*—Shapiro and Shapiro

[57] ABSTRACT

A tilt type steering apparatus makes the amount of downward protrusion of the front end position of a rear steering column small to prevent interference with knees and prevents the rear steering column from becoming longer than necessary. A first lateral shaft connects a front steering column to a rear steering column. A second lateral shaft, provided under the rear steering column, is rockable about the first lateral shaft. An engagement member is pivotally supported by the second lateral shaft, and displacement side meshing teeth are formed on an upper edge of a front end portion of the engagement member. Fixed side meshing teeth are formed on a lower surface of a restraining member fixed to a lower surface of a support bracket. The displacement and fixed side meshing teeth are engaged and disengaged with each other by a rocking movement of a tilt lever.

16 Claims, 11 Drawing Sheets

TILT TYPE STEERING APPARATUS

CROSS-REFERENCE TO RELATED APPLICATION

This application is a continuation-in-part of application Ser. No. 08/421,607 filed Apr. 13, 1995 (abandoned).

BACKGROUND OF THE INVENTION

1. Field of the Invention

This invention relates to a tilt type steering apparatus, and particularly to improvements in a portion for supporting a steering column, constituting a steering apparatus for an automobile, rockably relative to a vehicle body.

2. Related Background Art

There is known a height adjusting apparatus for a steering wheel which is called a tilt type steering apparatus designed to vary the height of the steering wheel in conformity with the constitution or the driving posture of a driver. As such a tilt type steering apparatus, there is known one described, for example, in Japanese Utility Model Publication No. 2-34145.

The tilt type steering apparatus described in this publication is called the oscillating type and is constructed as shown in FIGS. 12 to 15 of the accompanying drawings. A steering column 2, formed into the shape of a cylinder to permit a steering shaft 1 to be inserted thereinto, is divided into a front steering column 3 and a rear steering column 4. These two steering columns 3 and 4 are connected together by a support bracket 5 fixedly supported on a vehicle body. The rear steering column 4 is rockable about lateral shafts 6, 6 provided in the support bracket 5. A restraining mechanism, engageable by a tilt lever 7 rockable about the lateral shafts 6, 6, is provided between the support bracket 5 and the rear steering column 4.

More particularly, one end of the rear steering column 4 is pivotally supported on the support bracket by the lateral shafts 6, 6 provided in the support bracket 5 fixed to the vehicle body on the lower surface or the like of a dashboard 8. Also, a first engagement member 9 is fixed to the lower side of the rear steering column 4. The lower surface of this first engagement member 9 forms an arcuate convex surface centered around the lateral shafts 6, 6, and first engagement teeth 10 are formed on this lower surface.

One end (the left end as viewed in FIGS. 13 and 15) of a second engagement member 12, engageable with the first engagement member 9 with the rocking movement of the tilt lever 7, is pivotally supported on another lateral shaft 11 provided in the support bracket 5. Second engagement teeth 13, engageable with the first engagement teeth 10 formed on the lower surface of the first engagement member 9, are formed on the upper edge of the other end portion (the upper edge of the right end portion as viewed in FIG. 13) of the second engagement member 12. Also, the intermediate portion of the tilt lever 7 is pivotally supported on the lateral shafts 6, 6. A roller 15 is supported on a shaft 14 having its end portion coupled to the lower end portion of the tilt lever 7, and the upper surface of this roller 15 bears against the lower surface of the second engagement member 12. Further, a pin 18 protruding from a side of the second engagement member 12 is engaged with an inclined slot 17 formed in a rockable plate 16 fixed to the tilt lever 7.

With the construction as described above, when the tilt lever 7 is rocked counter-clockwisely, the roller 15 retracts from below the other end portion (the right end portion as viewed in FIG. 13) of the second engagement member 12 and at the same time, the other end portion of the second engagement member 12 is downwardly displaced on the basis of the engagement between the inclined slot 17 and the pin 18.

As a result, the engagement between the second engagement teeth 13 formed on the upper surface of the other end portion of the second engagement member 12 and the first engagement teeth 10 on the lower surface of the first engagement member 9 fixed to the lower surface of the rear steering column 4 is released. In this state, the rear steering column 4 becomes rockable about the lateral shafts 6, 6 (within a range in which a pin 19 projectedly provided on a side of the rear steering column 4 can be displaced inside an arcuate slot 20 formed in the support bracket 5). On the basis of this rocking movement, the height position of a steering wheel fixed to the end portion of the steering shaft 1 inserted in the rear steering column 4 becomes adjustable.

Figure 13:
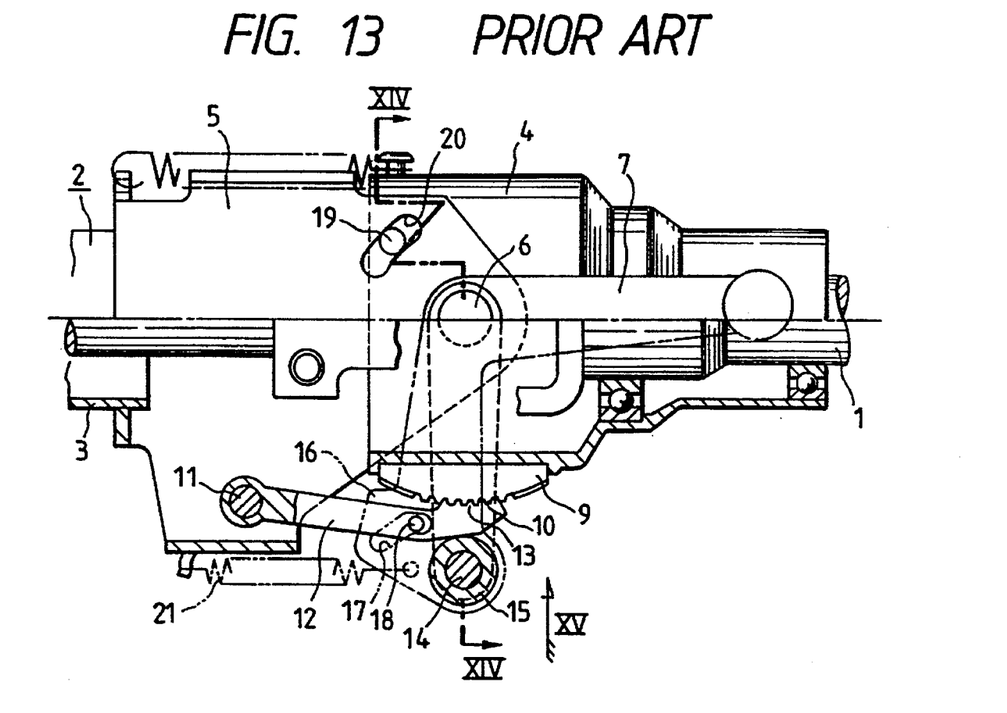
FIG. 13 is an enlarged cross-sectional view of the portion XIII of FIG. 12.
Figure 14:
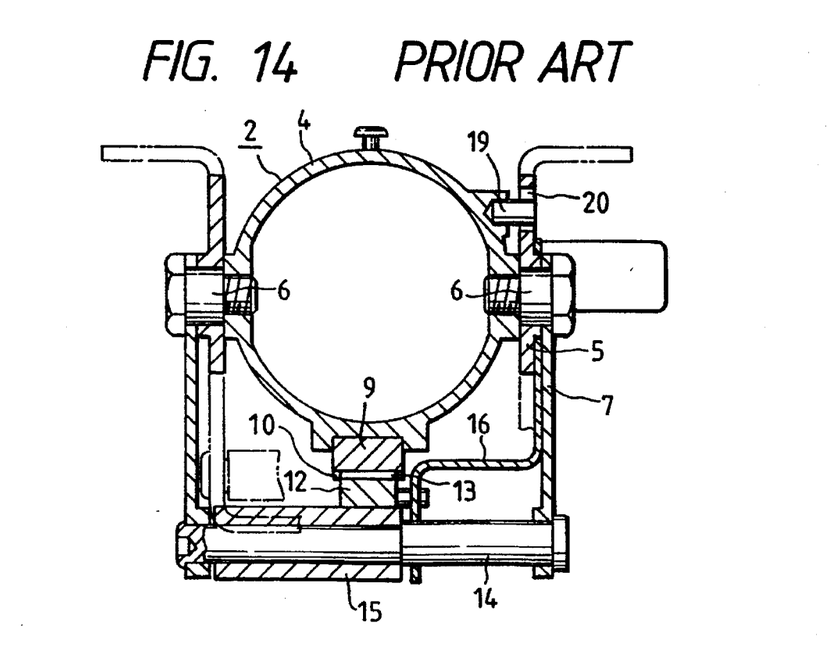
FIG. 14 is a cross-sectional view taken along the line XIV—XIV of FIG. 13.
Figure 15:
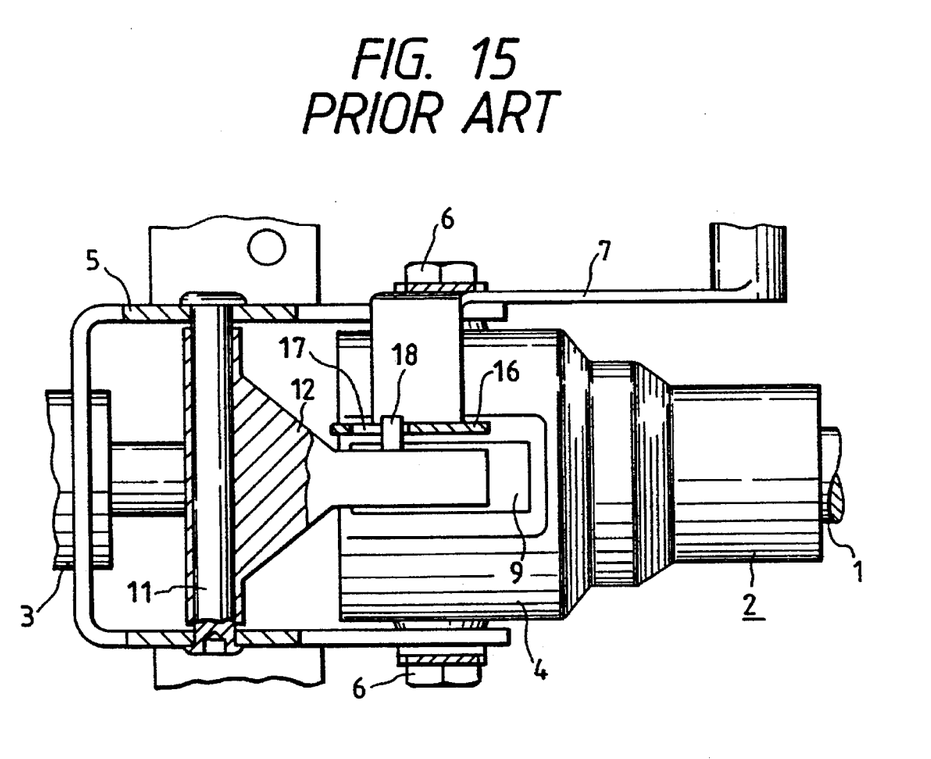
FIG. 15 is a view taken along the arrow XV of FIG. 13 with some portions sectioned.

When the height position of the steering wheel is adjusted in this manner, the tilt lever 7 is rocked clockwisely as viewed in FIG. 13. With this rocking movement, the roller 15 moves into below the other end portion of the second engagement member 12 and pushes the other end portion of this second engagement member 12 upwardly. Thus, it brings the second engagement teeth 13 formed on the upper surface of this other end portion into engagement with the first engagement teeth 10 formed on the lower surface of the first engagement member 9 fixed to the lower surface of the rear steering column 4. As a result, the rear steering column 4 does not rotate about the lateral shafts 6, 6, and the steering wheel is kept in its adjusted height position. A resilient force, which tends to rock the tilt lever 7 clockwisely as viewed in FIG. 13, is imparted by a tension spring 21 to the tilt lever 7 and therefore it never happens that the roller 15 inadvertently retracts from below the second engagement member 12.

In the case of the conventional tilt type steering apparatus constructed and used as described above, the first engagement member 9 is fixed to the lower surface of the front end portion of the rear steering column 4 and further, the rear end portion of the second engagement member 12 and the roller 15 are brought into engagement under the first engagement member 9. Therefore, a relatively large space for providing these members 9, 12 and 15 therein is required below the front end portion of the rear steering column 4. When incorporated into an actual automobile, these members 9, 12 and 15 are covered with a cover called a column cover, but the position of the lower surface of this column cover becomes lower and a driver's knee becomes liable to interfere with this column cover, and this is not preferable.

Also, the first engagement member 9 is fixed to the lower surface of the front end portion of the rear steering column 4, but the lengthwise dimension of this first engagement member 9 becomes great. Also, when a combination switch for operating lights, wipers, etc. is to be provided, for example, on the outer peripheral surface of the rear steering column 4, it is necessary to provide it rearwardly of the first engagement member 9. Accordingly, the lengthwise dimension of the rear steering column 4 is liable to become greater than necessary.

When the lengthwise dimension of the rear steering column 4 becomes great, a force applied to the engaged portions of the first and second engagement members 9 and 12 by a moment force applied to the rear steering column 4 through the steering wheel becomes great. Accordingly, in order to prevent the two engagement members 9 and 12 from being brought out of engagement by the force applied to the steering wheel, it becomes necessary to make these two engagement members 9 and 12 large and strong. As a result, not only does the position of the lower end of the column cover become even lower, but also the weight thereof increases.

SUMMARY OF THE INVENTION

It is an object of the present invention to provide a tilt type steering apparatus having a decreased number of parts, that yet operates reliably.

The tilt type steering apparatus of the present invention is provided with a front steering column, a front steering shaft supported inside said front steering column for rotation only, a support bracket fixed to a vehicle body with the rear end portion of said front steering column fixedly supported, a first lateral shaft provided in a portion fixed to said support bracket, a rear steering column having its front end pivotally supported by said first lateral shaft, a rear steering shaft supported inside said rear steering column for rotation only, a universal joint for connecting the rear end portion of said rear steering shaft and the front end portion of said front steering shaft together, a second lateral shaft provided in a portion fixed to said rear steering column, an engagement member having its rear end portion pivotally supported on said second lateral shaft and having rack-like displacement side meshing teeth formed on the front end portion thereof, rack-like fixed side meshing teeth provided on a portion fixed to said support bracket and opposed to said displacement side meshing teeth, and a tilt lever for bringing said displacement side meshing teeth and said fixed side meshing teeth into and out of engagement with each other with rocking movement thereof.

Also, during non-operation of the tilt lever, said displacement side meshing teeth are urged against said fixed side meshing teeth. Said displacement side meshing teeth and said fixed side meshing teeth are plane teeth having flat surfaces bearing against each other. Further, when is the meshing pressure angle, which is an angle of inclination at which the direction of the bearing surfaces of the displacement side meshing teeth and fixed side meshing teeth intersects the direction of relative displacement of the displacement side meshing teeth and fixed side meshing teeth, and it is the coefficient of friction between the bearing surfaces of the displacement side meshing teeth and fixed side meshing teeth is $\alpha \leq \tan^{-1} \mu$.

Further, the shapes of said displacement side teeth and fixed side teeth are made longitudinally asymmetrical in order that, of said meshing pressure angle $\alpha$, a meshing pressure angle $\alpha_1$ corresponding to bearing surfaces urged against each other when an upward force is applied to the rear end portion of said rear steering column may be smaller than a meshing pressure angle $\alpha_2$ corresponding to bearing surfaces urged against each other when a downward force is applied to the rear end portion of said rear steering column.

When the height position of the steering wheel is to be adjusted in conformity with the constitution or the like of a driver by the tilt type steering apparatus of the present invention constructed as described above, the engagement between the displacement side meshing teeth and the fixed side meshing teeth is first released on the basis of the rocking movement of the tilt lever. In this state, the rear steering column is rocked about the first lateral shaft to thereby adjust the height position of the steering wheel fixed to the rear end portion of the rear steering shaft. After the adjustment, the tilt lever is rocked in the opposite direction, whereby the displacement side meshing teeth and the fixed side meshing teeth are brought into engagement with each other and the steering wheel is fixed at the height position after adjustment.

Particularly, in the case of the tilt type steering apparatus of the present invention, said displacement side meshing teeth and said fixed side meshing teeth are plane teeth and the meshing pressure angle $\alpha$ thereof is $\alpha \leq \tan^{-1} \mu$ in relation to the coefficient of friction $\mu$. Therefore, even if a member for hindering the displacement of the engagement member is not specially provided, the engagement between said meshing teeth will not be released unless said tilt lever is operated. Accordingly, the number of members provided under the front end portion of the member fixed to the rear steering column or the front end portion of the rear steering column can be reduced. Accordingly, the amount of downward protrusion of this portion can be made small and the lengthwise dimension of the rear steering column can be made small.

Further, since the meshing pressure angle $\alpha_1$, corresponding to the bearing surfaces urged against each other when an upward force is applied to the rear end portion of the rear steering column, is smaller than the meshing pressure angle $\alpha_2$, corresponding to the bearing surfaces urged against each other when a downward force is applied to the rear end portion of the rear steering column, said rear steering column can be reliably prevented from moving up. As a result, in the case of a collision, a driver's body can be reliably received by an air bag inflated rearwardly of the steering wheel.

DESCRIPTION OF THE PREFERRED EMBODIMENTS

FIGS. 1 to 4 show a first embodiment of the present invention. A front steering shaft 22 is supported inside a front steering column 3 only for rotation. Also, the rear end portion (the right end portion as viewed in FIG. 1) of the front steering column 3 is supported by a support bracket 5, made by press-molding a metal plate, through a support plate 46. The support bracket 5 is fixed to a vehicle body, in the lower portion of a dashboard 8 (see FIG. 12). The front end of a rear steering column 4 is pivotally supported on the rear end portion of the support bracket 5 by first lateral shafts 23, 23.

Circular holes 24 and 24 are formed in the right and left sides of the front end portion (the left end portion as viewed in FIG. 1) of the rear steering column 4, such as by the die casting of an aluminum alloy. A half portion of each first lateral shaft 23 is inserted in each circular hole 24 through each sliding bearing 25. Accordingly, the rear steering column 4 is supported rockably about the first lateral shafts 23, 23 relative to the support bracket 5.

Inside the rear steering column 4, a rear steering shaft 26 is supported for rotation only by a pair of front and rear deep groove ball bearings 27 and 27. The front end portion (the left end portion as viewed in FIG. 1) of the rear steering shaft 26 and the rear end portion (the right end portion as viewed in FIG. 1) of the front steering shaft 22 are connected together by a universal joint 28. In the case of this first embodiment, the center of displacement of the universal joint 28 is disposed on the extension of the pair of first lateral shafts 23 and 23. Accordingly, even when the rear steering column 4 is rocked about the first lateral shafts 23, 23, the transmission of rotational force between the front steering shaft 22 and the rear steering shaft 26 is effected smoothly.

Figure 1:
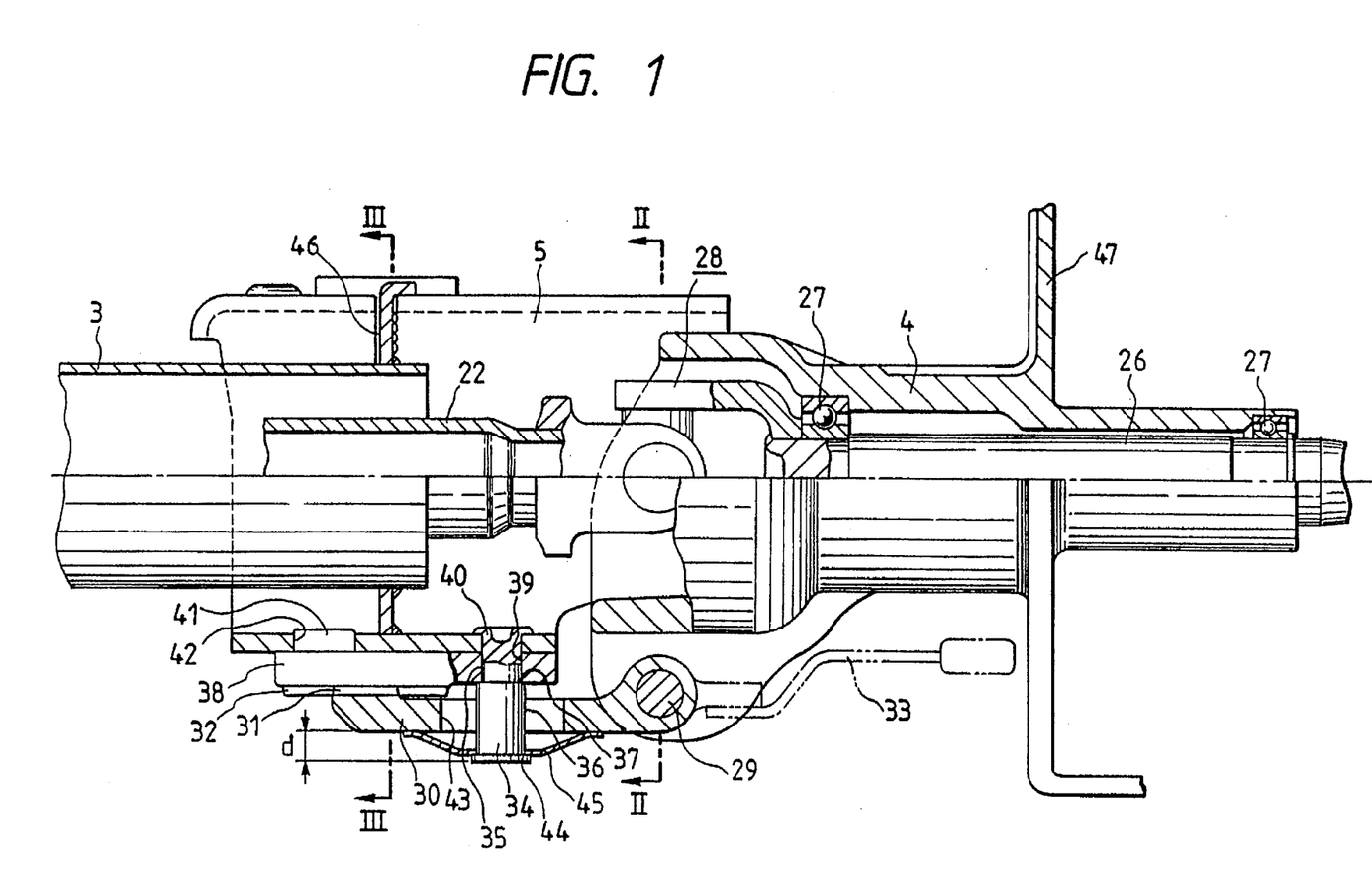
FIG. 1 is a longitudinal cross-sectional view showing the principle portions of a first embodiment of the present invention.
Figure 2:
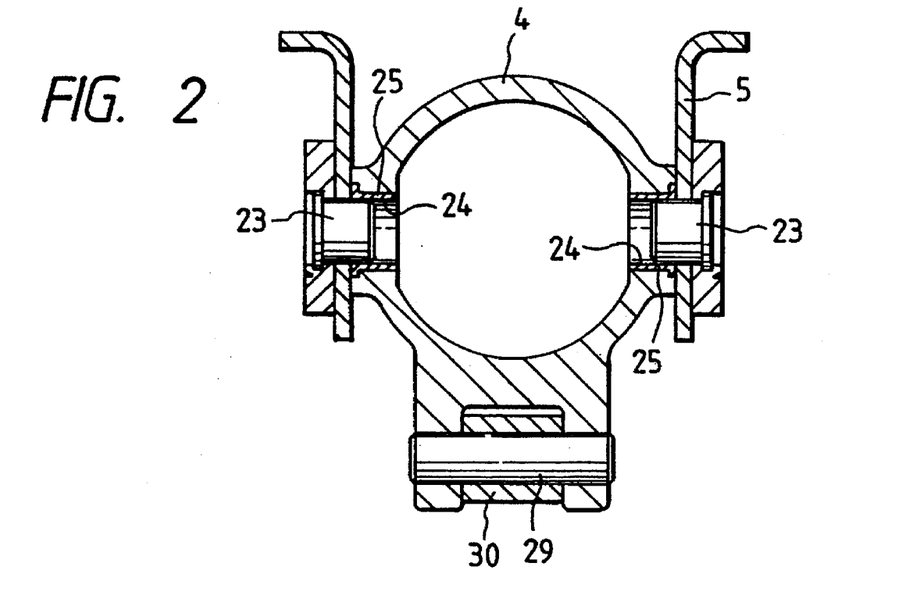
FIG. 2 is a cross-sectional view taken along the line II—II of FIG. 1 with some portions omitted.
Figure 3:
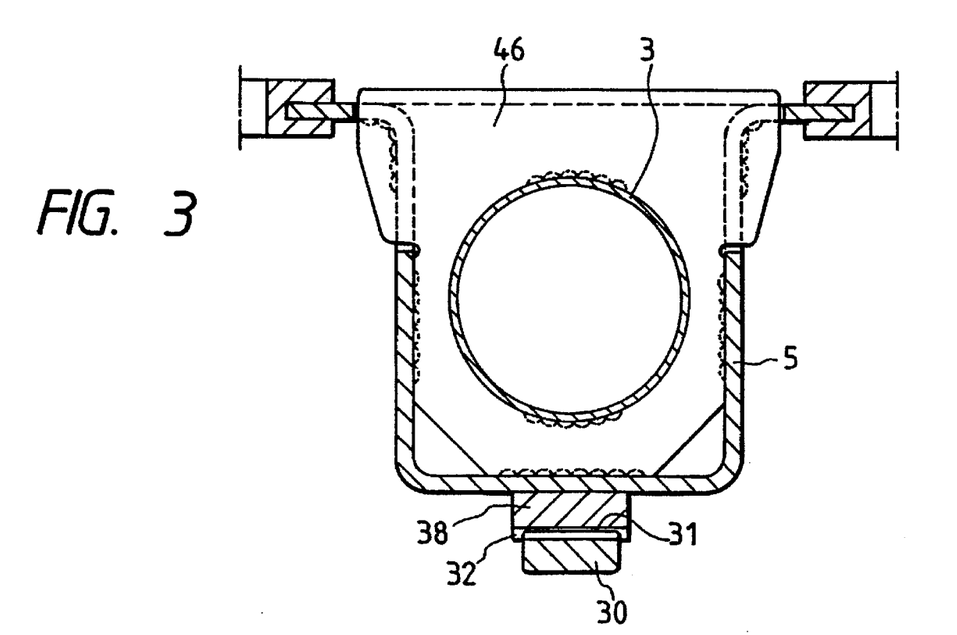
FIG. 3 is a cross-sectional view taken along the line III—III of FIG. 1.

Also, a second lateral shaft 29 is provided under the front end portion of the rear steering column 4, and the rear end portion of an engagement member 30 is pivotally supported on this second lateral shaft 29. Rack-like (plane gear-like) displacement side meshing teeth 31 are formed on the upper surface of the front end portion of the engagement member 30. A restraining member 38 is fixed to the lower surface portion of the support bracket 5 which is opposed to the displacement side meshing teeth 31, and rack-like fixed side meshing teeth 32 are formed on the lower surface of the restraining member 38.

The displacement side meshing teeth 31 and fixed side meshing teeth 32 are releasably engageable with each other on the basis of the rocking movement of a tilt lever 33. This tilt lever 33 has its base end portion (the left end portion as viewed in FIG. 1) fixedly coupled to the rear end portion of the engagement member 30. Accordingly, if the front end portion (the right end portion as viewed in FIG. 1) of the tilt lever 33 is rocked, the displacement side meshing teeth 31 and the fixed side meshing teeth 32 will be disengaged from each other with this rocking movement.

Also, the upper end portion of a restraining pin 34 is caulk-fixed to the rear end portion of the lower surface of the support bracket. This restraining pin 34 has its upper half small-diametered portion 35 and its lower half large-diametered portion 36 connected together by a stepped portion 37, and the small-diametered portion 35 is inserted in a circular hole 39 formed in the restraining member 38 and a circular hole 40 formed in the lower surface of the support bracket 5. The upwardly protruding portion of the support bracket is caulked on the upper end portion of the small-diametered portion 35, and the restraining pin 34 and the restraining member 38 are thus fixed to the lower surface of the support bracket 5. The restraining member 38 is hindered from rotating about the restraining pin 34 by a protruded portion 41, formed on the upper surface of the front portion (the left portion as viewed in FIG. 1) of the restraining member 38, engaged with a through-hole 42 formed in the front portion of the lower surface of the support bracket 5.

Also, the large-diametered portion 36 of the restraining pin 34 is loosely inserted in a through-hole 43, which is long in the longitudinal direction (the right to left direction as viewed in FIG. 1), formed in the intermediate portion of the engagement member 30, and protrudes downwardly from the lower surface of this engagement member 30. A leaf spring 45 is provided between the upper surface of a flange portion 44 formed on the outer peripheral surface of the lower end portion of the restraining pin 34 and the lower surface of the engagement member 30. This leaf spring 45 has a small resilient force that is only sufficient to raise the front portion (the left portion as viewed in FIG. 1) of the engagement member 30 to bring the displacement side meshing teeth 31 and the fixed side meshing teeth 32 into engagement with each other. Instead of this leaf spring 45, other resilient member such as a coil spring or a rubber ring can be used to urge the displacement side meshing teeth 31 toward the fixed side meshing teeth 32 during non-operation of the tilt lever.

Further, in the case of the tilt type steering apparatus of the present invention, the displacement side meshing teeth 31 and the fixed side meshing teeth 32 are plane teeth bearing against each other by flat surfaces. That is, these meshing teeth 31 and 32 are not curved surface teeth made from trochoidal curves or the like, but are large-diametered teeth of which the opposite sides are flat. The meshing pressure angle $\alpha$, which is the angle of inclination at which the direction of the bearing surfaces (the direction indicated by dot-and-dash line X in FIG. 4) of the displacement side meshing teeth 31 and fixed side meshing teeth 32 intersects the direction of relative displacement (the direction indicated by dot-and-dash line Y in FIG. 4) of the displacement side meshing teeth 31 and fixed side meshing teeth 32, is made small in the relation to the coefficient of friction $\mu$ between the bearing surfaces of the displacement side meshing teeth 31 and fixed side meshing teeth 32. That is, $\alpha \leq \tan^{-1} \mu$ then the coefficient of friction between the bearing surfaces of the displacement side meshing teeth 31 and fixed side meshing teeth 32 is $\mu$.

Although not shown, between the support bracket 5 and the rear steering column 4, there is provided a support spring for supporting the weight of the rear steering column 4 and a member such as a steering wheel supported by this rear steering column 4. This support spring, can be for example, a coil spring provided between the lower surface portion of the support bracket 5 and the lower surface portion of the rear steering column 4, or a tension spring provided between the upper surface portion of the support bracket 5 and the upper surface portion of the rear steering column 4. In any case, it is to be understood that the resilient force of the support spring is only for substantially supporting the weight of the member supported by the rear steering column 4. This is for preventing the steering wheel from lowering vigorously (when the support spring is absent or, if present, when its resilient force is too small) or rising vigorously (when the resilient force of the support spring is too great) when the engagement between the displacement side meshing teeth 31 and the fixed side meshing teeth 32 is released.

When the height position of the steering wheel is to be adjusted in conformity with the constitution or the like of a driver by the tilt type steering apparatus of the present invention constructed as described above, the rear end portion (the right end portion as viewed in FIG. 1) of the tilt lever 33 is first displaced upwardly. On the basis of this operation, the tilt lever 33 and the engagement member 30 rock counter-clockwisely as viewed in FIG. 1 about the second lateral shaft 29 against the resilient force of the leaf spring 45. With this rocking movement, the engagement between the displacement side meshing teeth 31 and the fixed side meshing teeth 32 is released.

In this state, the rear steering column 4 is rocked about the first lateral shafts 23, 23 to thereby adjust the height position of the steering wheel, not shown, fixed to the rear end portion of the rear steering shaft 26. This adjusting work can be easily done due to the presence of the support spring. After the adjustment, the rear end portion of the tilt lever 33 is lowered, and this tilt lever 33 and the engagement member 30 are rocked clockwisely as viewed in FIG. 1 about the second lateral shaft 29. With this rocking movement, the displacement side meshing teeth 31 and the fixed side meshing teeth become engaged with each other under the resilient force of the leaf spring 45. As a result, the steering wheel is fixed at the height position after adjustment.

Particularly, in the case of the tilt type steering apparatus of the present invention, the displacement side meshing teeth 31 and the fixed side meshing teeth 32 are plane teeth and the meshing pressure angle $\alpha$ thereof is a $\alpha \leq \tan^{-1}\mu$ in relation to the coefficient of friction $\mu$. Therefore, even if a member for hindering the displacement of the engagement member 30 is not specially provided, the meshing engagement between the meshing teeth 31 and 32 will not be released unless the tilt lever 33 is operated.

Figure 4:
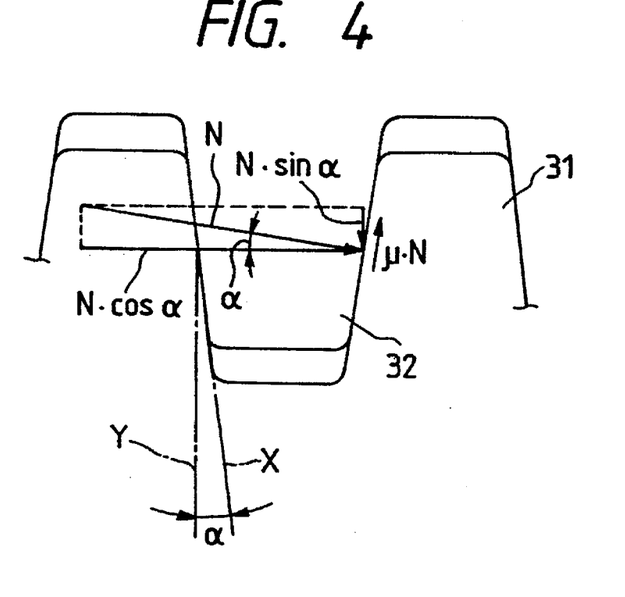
FIG. 4 is an enlarged view showing the meshing engaged portions of fixed side meshing teeth and displacement side meshing teeth.

This point will now be described in detail with reference to FIG. 4. When, for example, a downward force is applied to the steering wheel with the displacement side meshing teeth 31 and the fixed side meshing teeth 32 brought into meshing engagement with each other to fix the height position of the steering wheel, a force which tends to rock the rear steering column 4 clockwisely as viewed in FIG. 1 about the first lateral shafts 23, 23 is applied. The front side (the left side as viewed in FIG. 4) of each of the displacement side meshing teeth 31 is urged toward the rear side (the right side as viewed in FIG. 4) of each of the fixed side meshing teeth 32 with a force N. Each of these sides is inclined by $\alpha$ with respect to the direction of relative displacement of the displacement side meshing teeth 31 and the fixed side meshing teeth 32. Therefore, the displacement side meshing teeth 31 are subjected to a force N·sin $\alpha$ in a direction away from the fixed side meshing teeth 32. However, when the coefficient of friction between said two sides is $\mu$, a frictional force $\mu$·N acts in the direction of the tooth surfaces of these two sides, and a force $\mu$·N·cos$\alpha$ acts in a direction to hinder the displacement of these sides, i.e., a force in a direction Y. Also, the leaf spring 45 acts in a direction to maintain the engagement between the displacement side meshing teeth 31 and the fixed side meshing teeth 32.

Accordingly, if $\mu$·N·cos$\alpha \geq$ N·sin$\alpha$, that is, $\mu \geq$ sin$\alpha$/cos$\alpha$= tan$\alpha$, the engagement between the meshing teeth 31 and 32 could be reliably maintained even if, besides the leaf spring 45, there is not provided any member for urging the displacement side meshing teeth 31 toward the fixed side meshing teeth 32. Since in the case of the tilt type steering apparatus of the present invention, $\alpha \leq \tan^{-1}\mu$ and $\mu$·N·cos$\alpha \geq$N·sin$\alpha$, it never happens that the engagement between the displacement side meshing teeth 31 and the fixed side meshing teeth 32 is released by the force applied to the steering wheel.

Accordingly, the shaft 14 and roller 15 (FIGS. 13 to 14) incorporated in the conventional structure can be eliminated and the number of members provided under the rear steering column 4 and support bracket 5 can be reduced. As a result, the amount of downward protrusion of this portion can be reduced and the constituents of the tilt type steering apparatus can be prevented from interfering with the driver's knee. Also, it is unnecessary to mount a member like the first engagement member 9 (FIGS. 13 to 15) incorporated in the conventional structure on the lower surface of the rear steering column 4 and therefore, the lengthwise dimension of the rear steering column 4 can be made small. A mounting plate 47 shown in FIG. 1 is for supporting a combination switch.

Figure 5:
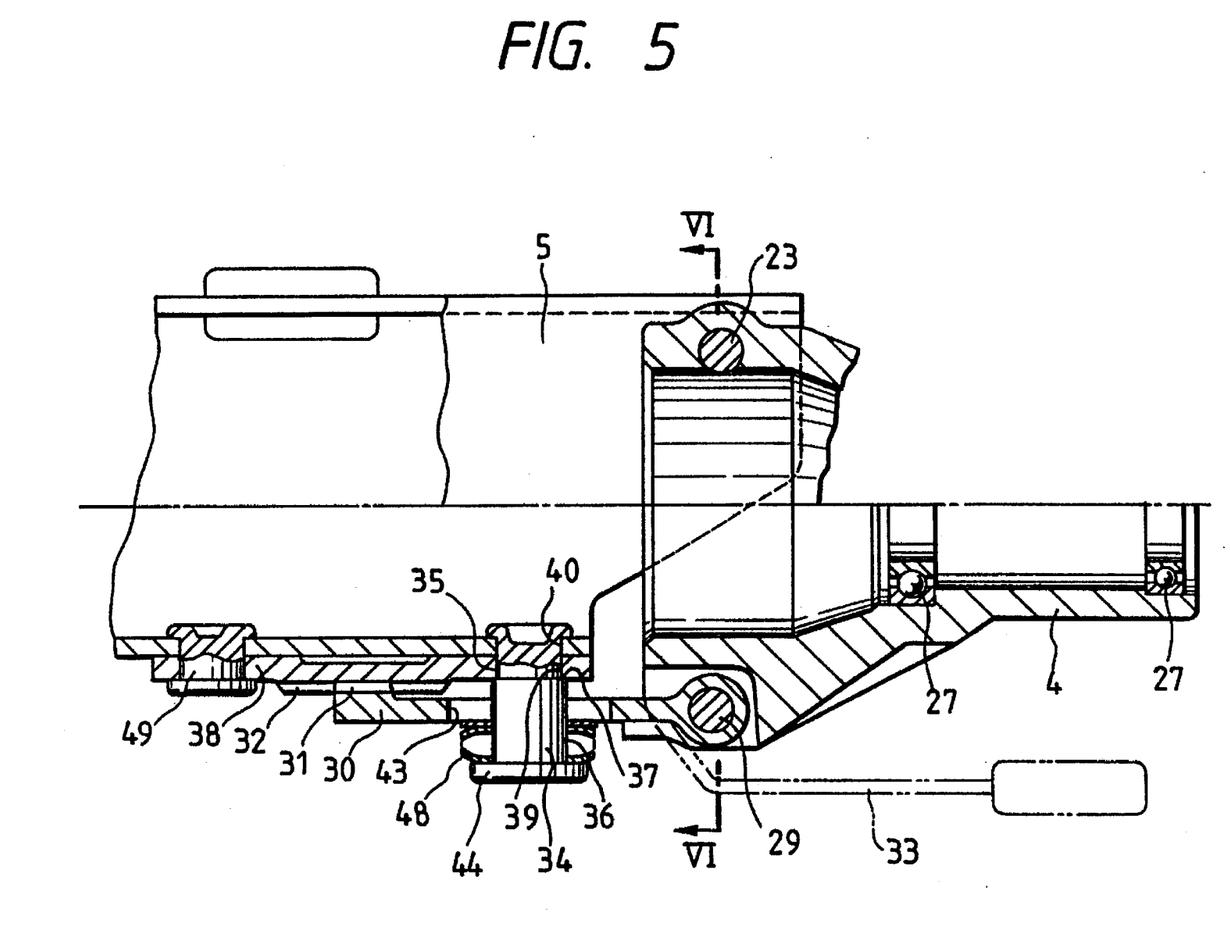
FIG. 5 is a longitudinal cross-sectional view showing the principal portions of a second embodiment of the present invention.
Figure 6:
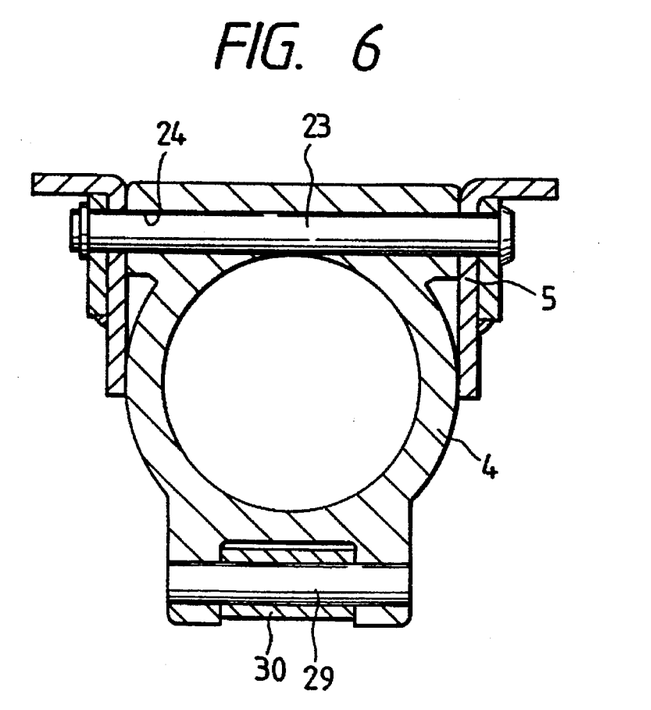
FIG. 6 is a cross-sectional view taken along the line VI—VI of FIG. 5 with some portions omitted.

FIGS. 5 and 6 show a second embodiment of the present invention. In this embodiment, a first lateral shaft 23 for pivotally supporting the rear steering column 4 on the support bracket 5 is provided so as to extend through the upper portion of the rear end (the right end as viewed in FIG. 5) of the support bracket 5 and the upper portion of the front end (the left end as viewed in FIG. 5) of the rear steering column 4. The center of displacement of the universal joint 28 (see FIG. 1) for connecting the front steering shaft 22 (see FIG. 1) and the rear steering shaft 26 (see FIG. 1) together does not exist on the first lateral shaft 23. Accordingly, there is the disadvantage that it becomes necessary to provide displacement absorbing structures such as a spline engagement portion and a slide joint on one of the steering shafts 22 and 26 (see FIG. 1) to absorb the displacement resulting from adjusting the height position of the steering wheel, while there are the following advantages (1) to (3):

(1) Since the first lateral shaft 23 can be constructed of a single shaft, the adjusting work of disposing two shafts coaxially becomes unnecessary.

(2) As compared with the case where two first lateral shafts 23 are provided, the prevention of the inclination of the first lateral shaft 23 and the countermeasure for the prevention of the slipping-off thereof become easy.

(3) The distance between the first lateral shaft 23 and the meshing engagement portion between the displacement side and fixed side meshing teeth 31 and 32 can be made great. As a result, even when a vertical force is applied to the steering wheel, the force acting on the first lateral shaft 23 and the meshing engagement portion becomes small. As a result, the first lateral shaft 23 and the displacement side and fixed side meshing teeth 31 and 32 can be made compact.

Also, this second embodiment differs in the following points from the aforedescribed first embodiment. In the present embodiment, a belleville spring 48 is provided as a resilient member between the upper surface of a flange portion 44 on the lower end portion of a restraining pin 34 and the lower surface of the intermediate portion of an engagement member 30. Also, the front end portion (the left end portion as viewed in FIG. 5) of the restraining member 38 is fixed to the lower surface of the support bracket 5 by a rivet 49. Further, the front end portion (the left end portion as viewed in FIG. 5) of the tilt lever 33 is fixedly coupled to the forward side (the left side as viewed in FIG. 5) of the second lateral shaft 29 in the base portion of the engagement member 30. In regard to the other points, the construction and operation of the second embodiment are similar to those of the aforedescribed first embodiment and therefore, equivalent portions are given similar reference numerals and need not be described.

Figure 7:
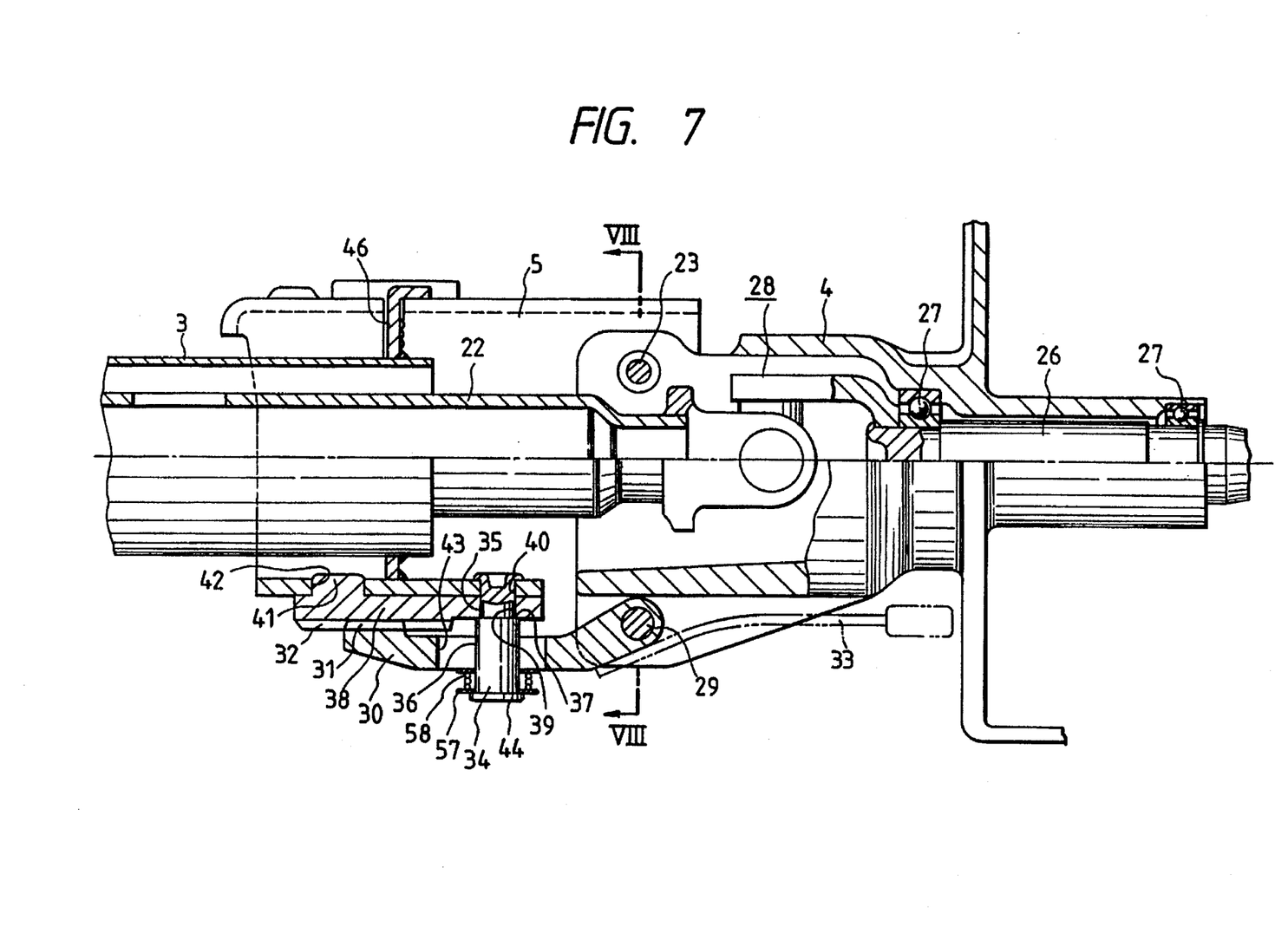
FIG. 7 is a longitudinal cross-sectional view showing the principal portions of a third embodiment of the present invention.
Figure 8:
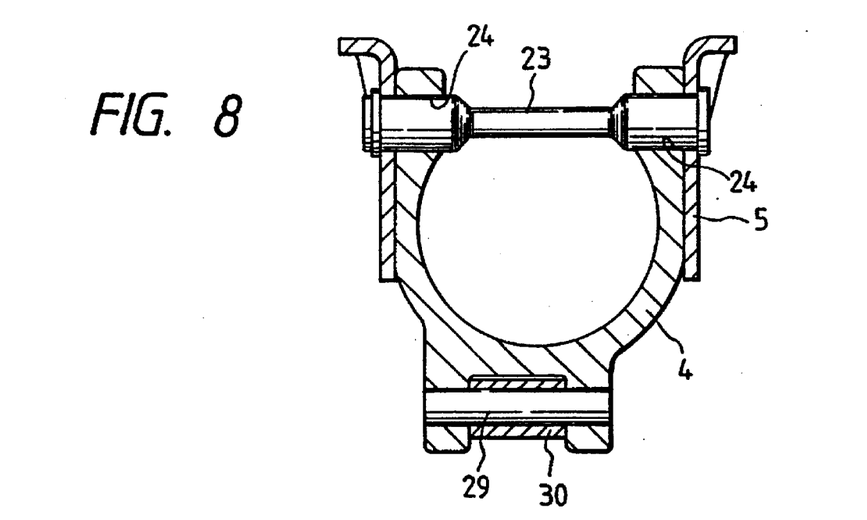
FIG. 8 is a cross-sectional view taken along the line VIII—VIII of FIG. 7 with some portions omitted.

FIGS. 7 and 8 show a third embodiment of the present invention. In this embodiment, the center of displacement of the universal joint 28 for connecting the front steering shaft 22 and the rear steering shaft 26 together is deviated rearwardly (rightwardly as viewed in FIG. 7) from the first lateral shaft 23. As a result of rearward deviation of the center of displacement of the universal joint 28, the amount of movement of the center of displacement of the universal joint 28 in the axial direction (the right to left direction as viewed in FIG. 7) becomes small even when the rear steering column 4 is rocked about the first lateral shaft 23 to adjust the height position of the steering wheel. Accordingly, even if a displacement absorbing structure is not specially provided, this small amount of movement could be absorbed by the play of each portion. Preferably, a resilient coupling capable of absorbing this small amount of movement is provided in series with the front steering shaft 22 or the rear steering shaft 26.

Also, in this third embodiment, the second lateral shaft 29 is offset sideways. This is done so that an installment space for a compression spring provided between the rear steering column 4 and the support bracket 5 to support the weight of the rear steering column 4 supporting the steering wheel may be provided to the side of the rear steering column 4. Further, the front end portion of the rear steering column 4 is of a shape in which the upper portion thereof opens, and the intermediate portion of the first lateral shaft 23 is of a small diameter. Such a first lateral shaft 23 of which only the intermediate portion is of a small diameter can be a strong shaft and yet can have lighter weight and prevent interference with the steering shaft 22. Also, a restraining ring 57 is restrained on the upper surface of a flange portion 44 at the lower end of the restraining pin 34, and a compression spring 58 is provided between the upper surface of this restraining ring 57 and the lower surface of the engagement member 30. In regard to the other points, the construction and operation of the third embodiment are substantially similar to those of the aforedescribed first or second embodiments and therefore, equivalent portions are given the same reference numerals and need not be described.

Figure 9:
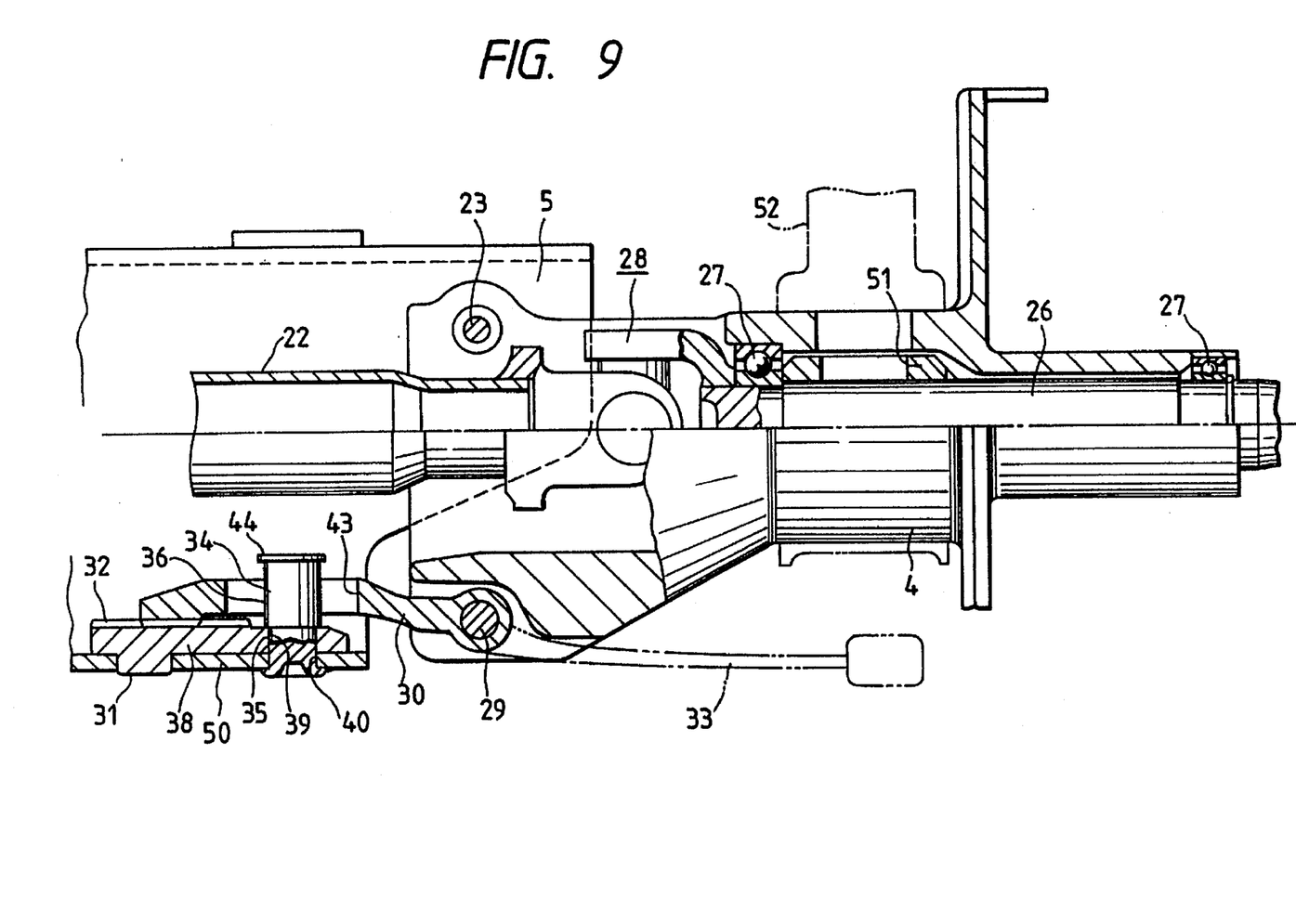
FIG. 9 is a longitudinal cross-sectional view showing the principal portions of a fourth embodiment of the present invention.

FIG. 9 shows a fourth embodiment of the present invention. In this embodiment, a restraining member 38 is fixed to the upper surface of the connecting plate portion 50 of the support bracket 5. Also, the rear end portion (the right end portion as viewed in FIG. 9) of the engagement member 30 is pivotally supported on the front end portion (the left end portion as viewed in FIG. 9) of the rear steering column 4 by the second lateral shaft 29. The displacement side meshing teeth 31 formed on the lower edge of the front end portion of the engagement member 30 are opposed to the fixed side meshing teeth 32 formed on the upper surface of the restraining member 38. In the present embodiment, the displacement side meshing teeth 31 are urged toward the fixed side meshing teeth 32 on the basis of the weight of the engagement member 30 during non-operation of the tilt lever 30. Accordingly, a resilient member for urging the displacement side meshing teeth 31 against the fixed side meshing teeth 32 is absent. In FIG. 9, a collar 51 fixed to the outer peripheral surface of the rear steering shaft 26 and a key cylinder 52 fixed to the outer peripheral surface of the rear steering column 4 are members for constituting a steering lock device. In the present embodiment, the engagement member 30 and the restraining member 38 are not exposed below the support bracket 5 and therefore, the interference of these members 30 and 38 with the driver's knee can be prevented more reliably. In regard to the other points, the construction and operation of the fourth embodiment are substantially similar to those of the aforedescribed third embodiment and therefore, equivalent portions are given the same reference numerals and need not be described.

Figure 10:
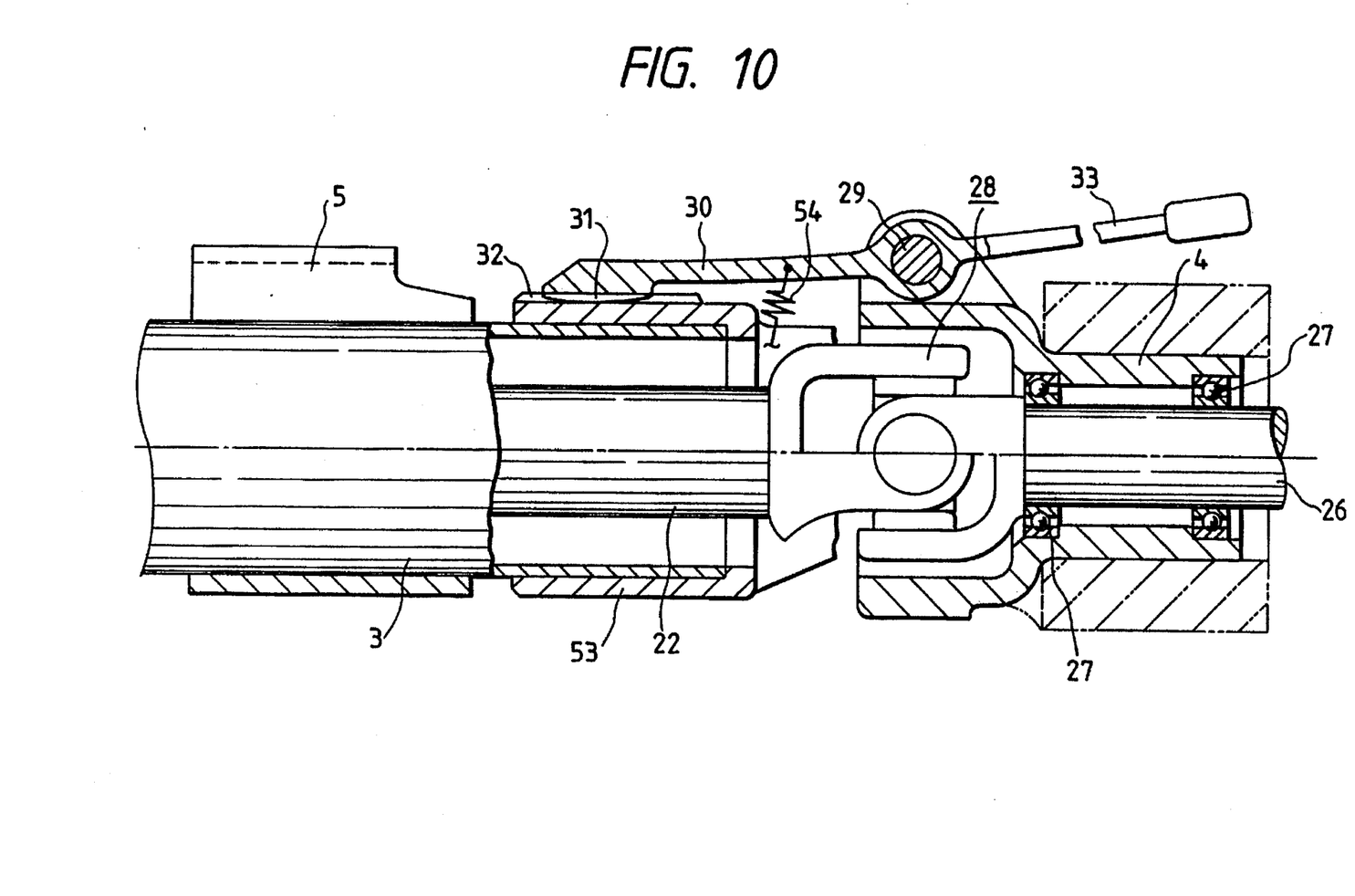
FIG. 10 is a longitudinal cross-sectional view showing the principal portions of a fifth embodiment of the present invention.

FIG. 10 shows a fifth embodiment of the present invention. In this embodiment, a connecting bracket 53 is fixedly fitted to the rear end portion of the front steering column 3, and the front end portion of the rear steering column 4 is pivotally supported on the connecting bracket 53 by a pair of right and left first lateral shafts. Also, fixed side meshing teeth 32 are formed on the upper surface of the connecting bracket 53. Also, a second lateral shaft 29 is provided on the upper surface of the front end portion of the rear steering column 4, and the rear end portion (the right end portion as viewed in FIG. 10) of the engagement member 30 is pivotally supported by the second lateral shaft 29. The tilt lever 33 extends from the rear end portion of the engagement member 30. Further, a tension spring 54 is provided between the engagement member 30 and the connecting bracket 53, and urges the displacement side meshing teeth 31 formed on the lower edge of the front end portion (the left end portion as viewed in FIG. 10) of the engagement member 30 toward the fixed side meshing teeth 32. In the present embodiment, the engagement member 30 is not positioned below the support bracket 5 and therefore, the interference of these members 30 and 38 with the driver's knee can be prevented more reliably. The shape of the outer surface of the displacement side meshing teeth 31 may be that of convex plane teeth having a great radius of curvature to absorb meshing deviation. In regard to the other points, the construction and operation of the fifth embodiment are substantially similar to those of the aforedescribed first embodiment and therefore, equivalent portions are given the same reference numerals and need not be described.

Figure 11:
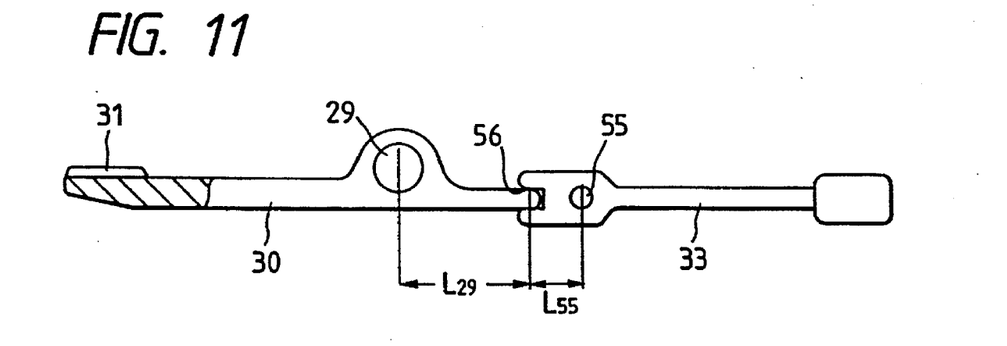
FIG. 11 is a fragmentary longitudinal cross-sectional view showing a sixth embodiment of present invention.
Figure 12:
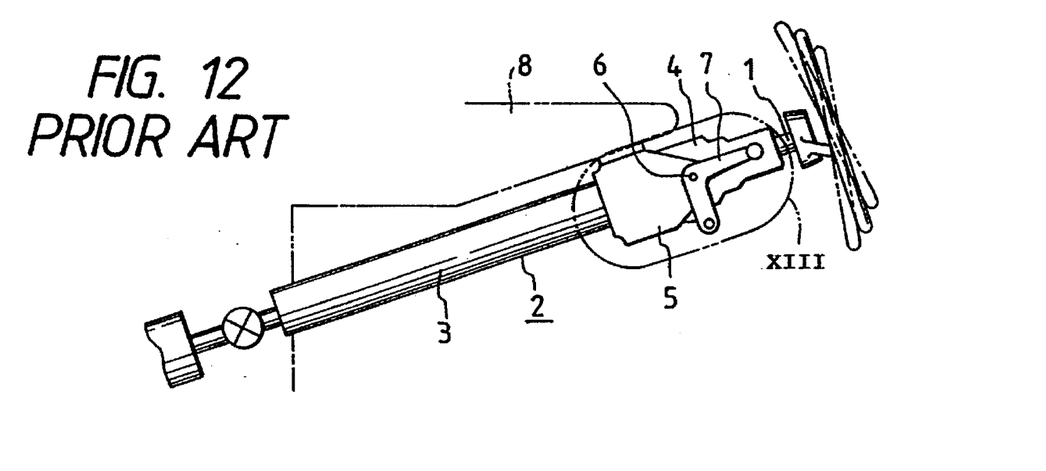
FIG. 12 is a side view showing an example of the known tilt type steering apparatus.

In the above-described first to fifth embodiments, the displacement side meshing teeth 31 and the fixed side meshing teeth 32 are brought into and out of engagement with each other simply by the tilt lever 33 being slightly rocked. As a result, the amount of movement of the tilt lever 33 may become too small and may give a feeling of physical disorder to the operator. If the amount of displacement of the engagement member 30 is made great, the amount of movement of the tilt lever 33 could be made great, but for example, the protrusion dimension d of the lower end portion of the restraining pin 34 shown in FIG. 1 will become great, and this is not preferable. So, in order to eliminate the feeling of physical disorder as described above without making this protrusion dimension d great, the amount of movement of the tilt lever 33 can be increased by such structure as shown in FIG. 11 which shows a sixth embodiment. That is, the tilt lever 33 is pivotally supported by a third lateral shaft 55 provided in parallel to the second lateral shaft 29, and a concave portion 56 formed on the front end portion (the left end portion as viewed in FIG. 11) of the tilt lever 33 is brought into engagement with the rear end portion (the right end portion as viewed in FIG. 11) of the engagement member 30. With such a construction, the amount of movement of the tilt lever 33 can be increased by an amount corresponding to the ratio ($L_{29}/L_{55}$) between the distance $L_{29}$ from the engagement portion between the concave portion 56 and the rear end portion of the engagement member 30 to the second lateral shaft 29 and the distance $L_{55}$ from said engagement portion to the third lateral shaft 55.

The present invention is constructed and operates as described above and can therefore provide a tilt type steering apparatus which is compact and light in weight and, moreover, in which it is difficult for interference with the driver's knee to occur.

Figure 16A:
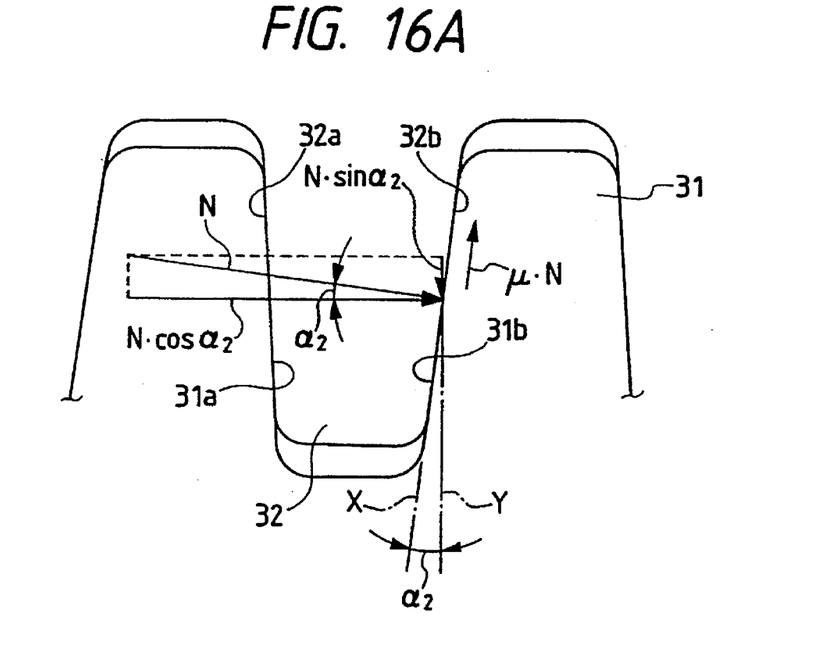
FIGS. 16A and 16B are enlarged views respectively showing the meshing engaged portions of fixed side meshing teeth and displacement side meshing teeth of another embodiment.
Figure 16B:
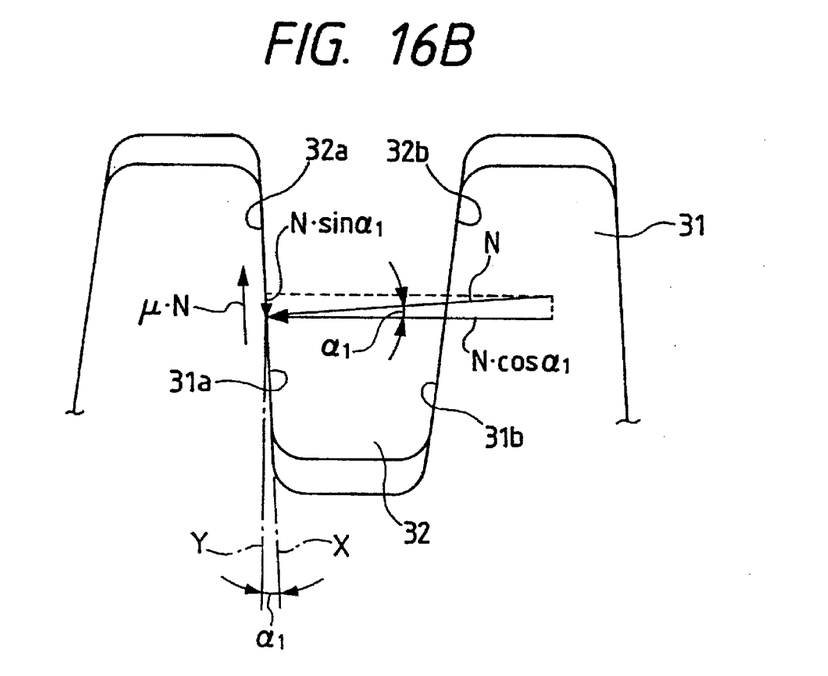

Next, a seventh embodiment of this invention will be described below, with reference to FIGS. 16A and 16B.

In the case of the tilt type steering apparatus of the seventh embodiment, the displacement side meshing teeth 31 and the fixed side meshing teeth 32 are plane teeth with flat surfaces bearing against each other. That is, these meshing teeth 31 and 32 are not curved surface teeth made from trochoidal curves or the like, but are large-diametered teeth of which the opposite sides are flat. The meshing pressure angle $\alpha$ (referred to below as $\alpha_1$ and $\alpha_2$), which is the angle of inclination at which the direction of the bearing surfaces (the direction indicated by dot-and-dash line X in FIGS. 16A and 16B) of the displacement side meshing teeth 31 and fixed side meshing teeth 32 intersects the direction perpendicular to the pitch line (the direction indicated by dot-and-dash line Y in FIGS. 16A and 16B) of the displacement side meshing teeth 31 and fixed side meshing teeth 32, is made small in the relation to the coefficient of friction $\mu$ between the bearing surfaces of the displacement side meshing teeth 31 and fixed side meshing teeth 32. That is, $\alpha \leq \tan^{-1}\mu$ when the coefficient of friction between the bearing surfaces of the displacement side meshing teeth 31 and fixed side meshing teeth 32 is $\mu$.

Further, in the case of the tilt type steering apparatus of the sixth embodiment, the displacement side meshing teeth 31 and the fixed side meshing teeth 32 are made longitudinally asymmetrical. Also, the meshing pressure angle $\alpha_1$ between the rear side 31a (the right side as viewed in FIGS. 16A and 16B) of the displacement side meshing teeth 31 and the front side 32a (the left side as viewed in FIGS. 16A and 16B) of the fixed side meshing teeth 32, which bear against each other, is made smaller than the meshing pressure angle $\alpha_2$ between the front side 31b (the left side as viewed in FIGS. 16A and 16B) of the displacement side meshing teeth 31 and the rear side 32b (the right side as viewed in. FIGS. 16A and 16B) of the fixed side meshing teeth 32, which also bear against each other, $(\alpha_1 < \alpha_2)$. Of these meshing pressure angles $\alpha_1$ and $\alpha_2$, the value of the greater meshing pressure angle $\alpha_2$ is also regulated to satisfy the above-mentioned expression ($\alpha \leq \tan^{-1}\mu$). Accordingly, among these meshing pressure angles $\alpha_1$ and $\alpha_2$ and the above-mentioned coefficient of friction $\mu$, there is the relation that $\alpha_1 < \alpha_2 \leq \tan^{-1}\mu$.

Particularly, in the case of the tilt type steering apparatus of the seventh embodiment, the displacement side meshing teeth 31 and the fixed side meshing teeth 32 are plane teeth and, for the meshing pressure angles $\alpha_1$ and $\alpha_2$, $\alpha_1 < \alpha_2 \leq \tan^{-1}\mu$ in relation to the coefficient of friction $\mu$. Therefore, even if a member for hindering the displacement of the engagement member 30 is not specially provided, the meshing engagement between the meshing teeth 31 and 32 will not be released unless the tilt lever 33 is operated.

This point will now be described in detail with reference to FIGS. 16A and 16B. When, for example, a downward force is applied to the steering wheel with the displacement side meshing teeth 31 and the fixed side meshing teeth 32 brought into meshing engagement with each other to fix the height position of the steering wheel, a force with tends to rock the rear steering column 4 clockwisely as viewed in FIG. 1 about the first lateral shafts 23, 23 is applied. As shown in FIG. 16A, the front side 31b of the displacement side meshing teeth 31 is urged toward the rear side 32b of the fixed side meshing teeth 32 with a force N. Each of these sides 31b and 32b is inclined by $\alpha_2$ with respect to the direction of relative displacement of the displacement side meshing teeth 31 and the fixed side meshing teeth 32. Therefore, the displacement side meshing teeth 31 are subjected to a force $N \cdot \sin\alpha_2$ in a direction away from the fixed side meshing teeth 32. However, when the coefficient of friction between said two sides 31b and 32b is $\mu$, a frictional force $\mu \cdot N$ acts in the direction of the tooth surfaces of these two sides 31b and 32b, and a force $\mu \cdot N \cdot \cos\alpha_2$ acts in a direction to hinder the displacement of these sides 31b and 32b, i.e., a force in a direction Y. Also, the leaf spring 45 acts in a direction to maintain the engagement between the displacement side meshing teeth 31 and the fixed side meshing teeth 32.

Accordingly, if $\mu \cdot N \cdot \cos\alpha_2 \geq N \cdot \sin\alpha_2$, that is, $\mu \geq \sin\alpha_2 / \cos\alpha_2 = \tan\alpha_2$, the engagement between the meshing teeth 31 and 32 could be reliably maintained even if, besides the leaf spring 45, there is not provided any member for urging the displacement side meshing teeth 31 toward the fixed side meshing teeth 32. Since in the case of the tilt type steering apparatus of the present invention, $\alpha_2 \leq \tan^{-1}\mu$ and $\mu \cdot N \cdot \cos\alpha_2 \leq N \cdot \sin\alpha_2$, it never happens that the engagement between the displacement side meshing teeth 31 and the fixed side meshing teeth 32 is released by the force applied to the steering wheel.

Accordingly, the shaft 14 and roller 15 (FIGS. 13 to 14) incorporated in the conventional structure can be eliminated and the number of members provided under the rear steering column 4 and support bracket 5 can be reduced. As a result, the amount of downward protrusion of this portion can be reduced and the constituents of the tilt type steering apparatus can be prevented from interfering with the driver's knee. Also, it is unnecessary to mount a member like the first engagement member 9 (FIGS. 13 to 15) incorporated in the conventional structure on the lower surface of the rear steering column 4 and therefore, the lengthwise dimension of the rear steering column 4 can be made small. A mounting plate 47 shown in FIG. 1 is for supporting a combination switch.

Since the invention of the present application is constructed and operates as mentioned above, it can provide a tilt type steering apparatus which is compact and lightweight, and which can decrease the possibility of interference with a knee of a driver. In addition, since the invention can provide a superior function for preventing an upward displacement of a steering wheel, an air bag expanded at the rear side of the steering wheel upon a collision can securely receive a body of the driver.

What is claimed is:

1. A tilt type steering apparatus comprising a front steering column, a front steering shaft supported inside said front steering column for rotation only, a support bracket fixed to a vehicle body and that fixedly supports a rear end portion of said front steering column, a first lateral shaft connected to said support bracket, a rear steering column having a front end pivotally supported by said first lateral shaft, a rear steering shaft supported inside said rear steering column for rotation only, a universal joint for connecting a front end portion of said rear steering shaft and a rear end portion of said front steering shaft together, a second lateral shaft connected to said rear steering column, an engagement member having a rear end portion pivotally supported by said second lateral shaft and having displacement side linear-rack meshing teeth formed on a front end portion thereof, fixed side linear-rack meshing teeth provided on a portion fixed to said support bracket and opposed to said displacement side meshing teeth, and a tilt lever for bringing said displacement side meshing teeth and said fixed side meshing teeth into and out of engagement with each other by rocking movement thereof, said displacement side meshing teeth being urged toward said fixed side meshing teeth during non-operation of said tilt lever, said displacement side meshing teeth and said fixed side meshing teeth having flat bearing surfaces that engage each other when said fixed and displacement side meshing teeth are in engagement, wherein said tilt type steering apparatus satisfies the following condition:

$$\alpha \leq \tan^{-1} \mu$$

where $\alpha$ is an angle of intersection between a direction defined by engaged bearing surfaces of said displacement side meshing teeth and said fixed side meshing teeth and a direction of relative displacement between said displacement side meshing teeth and said fixed side meshing teeth, and $\mu$ is the coefficient of friction between the engaged bearing surfaces of said displacement side meshing teeth and said fixed side meshing teeth.

2. A tilt type steering apparatus comprising a front steering column, a front steering shaft supported inside said front steering column for rotation only, a support bracket fixed to a vehicle body and that fixedly supports a rear end portion of said front steering column, a first lateral shaft connected to said support bracket, a rear steering column having a front end pivotally supported by said first lateral shaft, a rear steering shaft supported inside said rear steering column for rotation only, a universal joint for connecting a front end portion of said rear steering shaft and a rear end portion of said front steering shaft together, a second lateral shaft connected to said rear steering column, an engagement member having a rear end portion pivotally supported by said second lateral shaft and having displacement side linear-rack meshing teeth formed on a front end portion thereof, fixed side linear-rack meshing teeth provided on a portion fixed to said support bracket and opposed to said displacement side meshing teeth, and a tilt lever for bringing said displacement side meshing teeth and said fixed side meshing teeth into and out of engagement with each other by rocking movement thereof, said displacement side meshing teeth being urged toward said fixed side meshing teeth during non-operation of said tilt lever, said displacement side meshing teeth and said fixed side meshing teeth having flat bearing surfaces that engage each other when said fixed and displacement side meshing teeth are in engagement, wherein said tilt type steering apparatus satisfies the following condition:

$$\alpha \leq \tan^{-1} \mu$$

where $\alpha$ is a meshing pressure angle which is an angle of intersection between a direction defined by engaged bearing surfaces of said displacement side meshing teeth and said fixed side meshing teeth and a direction perpendicular to pitch lines of said displacement side meshing teeth and said fixed side meshing teeth, and $\mu$ is the coefficient of friction between the bearing surfaces of said displacement side meshing teeth and said fixed side meshing teeth, and the shapes of said displacement side meshing teeth and said fixed side meshing teeth are made longitudinally asymmetrical so that a meshing pressure angle $\alpha_1$ corresponding to bearing surfaces engaging each other when an upward force is applied to the rear end portion of said rear steering column is smaller than a meshing pressure angle $\alpha_2$ corresponding to bearing surfaces engaging each other when a downward force is applied to the rear end portion of said rear steering column.

3. A tilt type steering apparatus, comprising:
a front steering column having a front steering shaft rotatably supported therein;
a rear steering column having a rear steering shaft rotatably supported therein, said rear steering column being pivotally supported relative to said front steering column;
a connection member for connecting said front steering shaft to said rear steering shaft;
a portion fixed relative to said front steering column and having fixed side linear-rack meshing teeth formed thereon, said fixed side meshing teeth having flat bearing surfaces; and
an engagement member including a front end portion having displacement side linear-rack meshing teeth formed thereon, said displacement side meshing teeth being opposed to said fixed side meshing teeth and having flat bearing surfaces for engaging said flat bearing surfaces of said fixed side meshing teeth, said engagement member being pivotable relative to said rear steering column to bring said displacement side meshing teeth into and out of engagement with said fixed side meshing teeth,
wherein said tilt type steering apparatus satisfies the following condition:

$$\alpha \leq \tan^{-1} \mu$$

where $\alpha$ is an angle of intersection between a direction defined by engaged bearing surfaces of said displacement and fixed side meshing teeth and a direction of relative displacement between said displacement and fixed side meshing teeth, and $\mu$ is the coefficient of friction between the engaged bearing surfaces of said displacement side meshing teeth and said fixed side meshing teeth.

4. A tilt steering apparatus according to claim 3, further comprising a support bracket fixed to a vehicle body and that fixedly supports a rear end portion of said front steering column and receives a first lateral shaft, said rear steering column having a front end portion pivotally supported by said first lateral shaft.

5. A tilt steering apparatus according to claim 4, further comprising a second lateral shaft connected to said rear steering column, wherein said engagement member has a rear end portion pivotally supported by said second lateral shaft.

6. A tilt steering apparatus according to claim 4, wherein said portion having said fixed side meshing teeth is fixed to said support bracket.

7. A tilt steering apparatus according to claim 3, wherein said connection member is a universal joint member.

8. A tilt steering apparatus according to claim 3, further comprising a tilt lever for bringing said displacement side meshing teeth and said fixed side meshing teeth into and out of engagement with each other, by rocking movement thereof.

9. A tilt steering apparatus according to claim 3, further comprising a device for urging said displacement side meshing teeth toward said fixed side meshing teeth.

10. A tilt type steering apparatus, comprising:
a front steering column having a front steering shaft rotatably supported therein;

a rear steering column having a rear steering shaft rotatably supported therein, said rear steering column being pivotally supported relative to said front steering column;

a connection member for connecting said front steering shaft to said rear steering shaft;

a portion fixed relative to said front steering column and having fixed side linear-rack meshing teeth formed thereon, said fixed side meshing teeth having flat bearing surfaces; and an engagement member including a front end portion having displacement side linear-rack meshing teeth formed thereon, said displacement side meshing teeth being opposed to said fixed side meshing teeth and having flat bearing surfaces for engaging said flat bearing surfaces of said fixed side meshing teeth, said engagement member being pivotable relative to said rear steering column to bring said displacement side meshing teeth into and out of engagement with said fixed side meshing teeth, wherein said tilt type steering apparatus satisfies the following condition:

$$\alpha \leq \tan^{-1} \mu$$

where $\alpha$ is a meshing pressure angle which is an angle of intersection between a direction defined by engaged bearing surfaces of said displacement side meshing teeth and said fixed side meshing teeth and a direction perpendicular to pitch lines of said displacement side meshing teeth and said fixed side meshing teeth, and $\mu$ is the coefficient of friction between the bearing surfaces of said displacement side meshing teeth and said fixed side meshing teeth, and the shapes of said displacement side meshing teeth and said fixed side meshing teeth are made longitudinally asymmetrical so that a meshing pressure angle $\alpha_1$ corresponding to bearing surfaces engaging each other when an upward force is applied to the rear end portion of said rear steering column is smaller than a meshing pressure angle $\alpha_2$ corresponding to bearing surfaces engaging each other when a downward force is applied to the rear end portion of said rear steering column.

11. A tilt steering apparatus according to claim 10, further comprising a support bracket fixed to a vehicle body and that fixedly supports a rear end portion of said front steering column and receives a first lateral shaft, said rear steering column having a front end portion pivotally supported by said first lateral shaft.

12. A tilt steering apparatus according to claim 11, further comprising a second lateral shaft connected to said rear steering column, wherein said engagement member has a rear end portion pivotally supported by said second lateral shaft.

13. A tilt steering apparatus according to claim 11, wherein said portion having said fixed side meshing teeth is fixed to said support bracket.

14. A tilt steering apparatus according to claim 10, wherein said connection member is a universal joint member.

15. A tilt steering apparatus according to claim 10, further comprising a tilt lever for bringing said displacement side meshing teeth and said fixed side meshing teeth into and out of engagement with each other, by rocking movement thereof.

16. A tilt steering apparatus according to claim 10, further comprising a device for urging said displacement side meshing teeth toward said fixed side meshing teeth.

* * * * *